United States Patent
Shih

(10) Patent No.: US 7,489,532 B2
(45) Date of Patent: Feb. 10, 2009

(54) APPARATUS AND METHOD FOR A POWER CONVERTER WITH FEED-FORWARD VOLTAGE COMPENSATION TO ENABLE A PFC CIRCUIT

(75) Inventor: Kuang Chih Shih, Taipei (TW)

(73) Assignee: System General Corporation, Taipei Hsien (TW)

( * ) Notice: Subject to any disclaimer, the term of this patent is extended or adjusted under 35 U.S.C. 154(b) by 82 days.

(21) Appl. No.: 11/400,356

(22) Filed: Apr. 10, 2006

(65) Prior Publication Data

US 2007/0159141 A1    Jul. 12, 2007

(30) Foreign Application Priority Data

Jan. 9, 2006    (TW) .............................. 95100808 A

(51) Int. Cl.
*G05F 1/70*   (2006.01)
*G05F 1/00*   (2006.01)
*H02M 5/42*   (2006.01)
*H02M 3/335*  (2006.01)
*H02M 5/45*   (2006.01)

(52) U.S. Cl. .................. 363/89; 323/207; 323/222; 323/284; 323/285; 323/288; 363/81; 363/21.01; 363/37; 363/80

(58) Field of Classification Search ................. 323/207; 363/89
See application file for complete search history.

(56) References Cited

U.S. PATENT DOCUMENTS 5,619,405 A * 4/1997 Kammiller et al. ............ 363/80

OTHER PUBLICATIONS

Lai et al., Time Quantity One-Cycle Control for Power-Factor Correctors, Mar. 1997, IEEE, Trans. on Power Electronics vol. 12 No. 2, p. 369-375.*

* cited by examiner

*Primary Examiner*—Akm E Ullah
*Assistant Examiner*—Jue Zhang
(74) *Attorney, Agent, or Firm*—Rosenberg, Klein & Lee

(57) ABSTRACT

Apparatus and method for a power converter with feed-forward voltage compensation to enable a PFC circuit are proposed. A voltage divider and a feedback unit output a compensation voltage and a feedback voltage in response to an input voltage and an output voltage, respectively. The feedback voltage is compensated by the compensation voltage through an operation unit. A comparator activates the PFC circuit within a predetermined input power range based on the already compensated feedback voltage. The proposed power converter can always activate the PFC circuit before the input power reaches 75 W regardless of any variation of the input voltage.

3 Claims, 3 Drawing Sheets

APPARATUS AND METHOD FOR A POWER CONVERTER WITH FEED-FORWARD VOLTAGE COMPENSATION TO ENABLE A PFC CIRCUIT

BACKGROUND OF THE INVENTION

1. Field of the Invention

The present invention relates to a power converter with feed-forward voltage compensation for enabling a power factor correction (PFC) circuit and a method thereof and, more particularly, to a power converter capable of activating a PFC circuit under the same input power condition and a method thereof.

2. Description of Related Art

According to the international standard IEC1000-3-2, the PFC circuit has to be activated to perform the power factor correction and boost procedure before the input power of a power converter with a PFC circuit reaches 75 W. In order to achieve the object of power saving, it is necessary for a power converter with a PFC circuit to close the action of the PFC circuit under a light load. The use of a PFC circuit is a well-known art in the field of the power converters. The PFC circuit is used to reduce the current harmonic at the power source of power converters so as to make the power factor of the input power of the power converters close to 1. Moreover, the PFC circuit also has the function of boosting voltage.

FIG. 1 is a circuit diagram of a conventional power converter with a PFC circuit. A power converter 1 comprises a PFC circuit 10, a power stage 20, a feedback unit 30 and a comparator 40. The PFC circuit 10 comprises a PFC converter 102, a PFC controller 104 and a bus capacitor $C_B$. The power stage 20 comprises a PWM converter 202 and a PWM controller 204.

The PFC converter 102 is controlled by the PFC controller 104 of the PFC circuit 10 in response to an input voltage $V_{IN}$. A bus voltage $V_{BUS}$ is built on the bus capacitor $C_B$ after the power factor correction and boost procedure are finished. The PWM converter 202 in the power stage 20 is to convert the bus voltage $V_{BUS}$ to an output voltage $V_{OUT}$ for a load.

As shown in FIG. 1, the feedback unit 30 receives a feedback voltage $V_{FB}$ in proportional to the load of the power stage 20. The feedback voltage $V_{FB}$ has a higher level under a heavy load and the feedback voltage $V_{FB}$ has a lower level under a light load. At the output of the power converter 1, the feedback voltage $V_{FB}$ and the input power increase once the load gradually rises from a light load to a heavy load. Under the requirement of the international standard IEC1000-3-2, the power converter 1 has to activate the PFC circuit 10 before the input power of the power converter 1 reaches 75 W.

The negative input of the comparator 40 receives a reference voltage $V_T$, and positive input of the comparator 40 receives the feedback voltage $V_{FB}$. The comparator 40 can be implemented by a hysteresis comparator. When the load of the power converter 1 is larger than the upper limit of the hysteresis range of the comparator 40, the comparator 40 generates a control signal $S_C$ in a high-level to drive the PFC controller 104. The PFC controller 104 generates a PFC drive signal $S_{PFC}$ in a high-level to the PFC converter 102, which then activates the power factor correction and boost procedure. Meanwhile, the input voltage $V_{IN}$ stored at the bus capacitor $C_B$ instantaneously rises to a high DC level, and the feedback voltage $V_{FB}$ drops relatively. When the load of the power converter 1 decreases and the feedback voltage $V_{FB}$ drops to below the lower limit of the hysteresis range of the comparator 40, the comparator 40 then outputs a control signal $S_C$ in a low-level to drive the PFC controller 104. The PFC controller 104 generates a PFC drive signal $S_{PFC}$ in a low-level to the PFC converter 102, which then closes the power factor correction and boost procedure.

Reference is made to FIG. 1 again. When the power switch Q in the power stage 20 is on, the energy $W_{IN}$ stored in the magnetizing inductance $L_P$ of the transformer T can be represented by, $$W_{IN} = \frac{1}{2} \times L_P \times I_P^2 = P_{IN} \times T_S \quad (1)$$

wherein the primary-side switching current $I_P$ flowing through the primary side of the transformer T can be represented by, $$I_P = \frac{V_{IN}}{L_P} \times t_{on} \quad (2)$$

The feedback voltage $V_{FB}$ will influence the primary-side switching current $I_P$ under the normal load. The magnitude of the primary-side switching current $I_P$ depends on the load. Therefore, the feedback voltage $V_{FB}$ is in proportional to the magnitude of the load. The output power increases and the feedback voltage $V_{FB}$ has a higher level under the heavy load. The output power decreases and the feedback voltage has a lower level under the light load.

The maximum input power $P_{IN}$ is obtained by substituting (2) into (1), $$P_{IN} = \frac{L_P}{2 \times T_S} \times I_P^2 = \frac{V_{IN}^2 \times t_{on}^2}{2 \times L_P \times T_S} \quad (3)$$

In Equations (1) to (3), $t_{on}$ is on-time of a PWM control signal $V_{PWM}$ when the power switch Q is on, and $T_S$ is the switching period of the PWM control signal $V_{PWM}$.

The conventional power converter 1 controls the PFC circuit 10 by means of the feedback voltage $V_{FB}$ and the hysteresis range of the comparator 40 to perform the power factor correction and boost procedure. When the feedback voltage $V_{FB}$ rises to the upper limit of the hysteresis range, the PFC circuit 10 performs the power factor correction and boost procedure. The PFC circuit 10 closes the power factor correction and boost procedure once the feedback voltage $V_{FB}$ drops to the lower limit of the hysteresis range. The feedback voltage $V_{FB}$ has a lower level when the input voltage $V_{IN}$ is high ($V_H$). The PFC circuit 10 usually activates the power factor correction and boost procedure only when the input power of the power converter 1 is larger than 75 W.

FIG. 2 is a curve showing the relation between the input voltage and the input power of a conventional power converter 1 when the PFC circuit is activated. From Equation (3), we know that the input power $P_{IN}$ of the power converter 1 is in proportional to the square of its input voltage $V_{IN}$. Therefore, the power converter 1 has to reach a larger input power $P_{INH}$ to control the PFC circuit 10 to enabling the boost procedure once the load is heavy and the input voltage $V_{IN}$ ($V_H$) is high.

Because the conventional power converter 1 activates the PFC circuit 10 only when the input power is larger than 75 W under the conditions of high input voltage $V_H$ (larger than 180

Vac) and heavy load (larger than 150 W). Hence, the requirement of the international standard IEC1000-3-2 cannot be satisfied.

SUMMARY OF THE INVENTION

An object of the present invention is to provide a power converter with feed-forward voltage compensation for enabling a PFC circuit and a method thereof, in which a complementary relation is accomplished between feedback voltage and input voltage so that the power converter can always enable the PFC circuit to perform the power factor correction and boost procedure before the input power reaches 75 W regardless of any variation of the input voltage.

The power converter of the present invention comprises a PFC circuit, a power stage, a feedback unit, a voltage divider, an operation unit and a comparator. The PFC circuit generates a bus voltage in response to an input voltage. The power stage outputs an output voltage in response to the bus voltage. The feedback unit outputs a feedback voltage in response to the output voltage. The voltage divider generates a compensation voltage in response to the input voltage. The operation unit and the comparator operate the feedback voltage, the compensation voltage and a reference voltage to produce a control signal for controlling the PFC circuit to perform power factor correction and boost procedure.

Besides, the present invention also provides a method for a power converter with feed-forward voltage compensation to enable a PFC circuit. The method comprises the steps of: generating a compensation voltage in response to an input voltage; generating a feedback voltage in response to an output voltage; providing a reference voltage; operating the reference voltage, the compensation voltage and the feedback voltage to generate a control signal; and enabling said PFC circuit in response to the control signal to perform power factor correction and boost procedure before the input power reaches 75 W.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
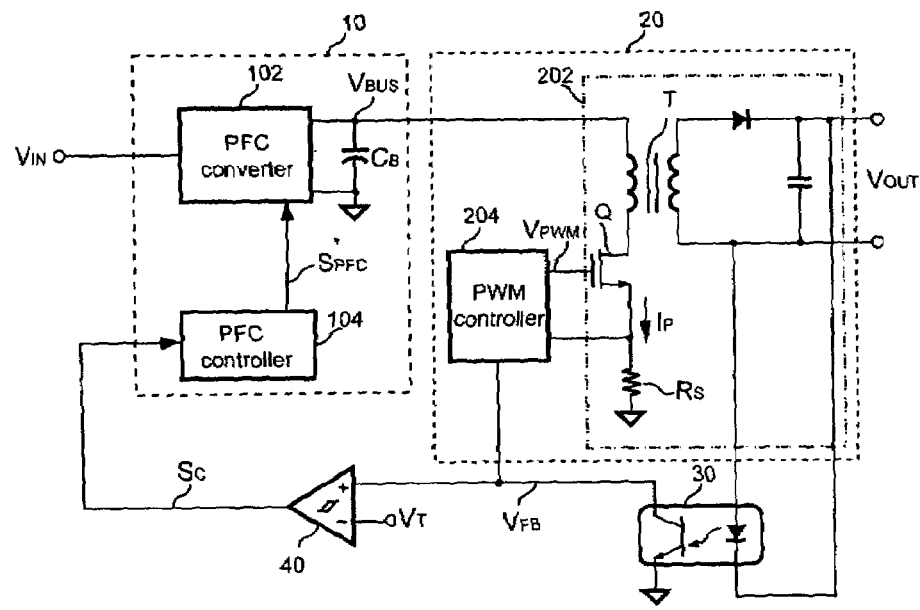
FIG. 1 is a circuit diagram of a conventional power converter with a PFC circuit.
Figure 2:
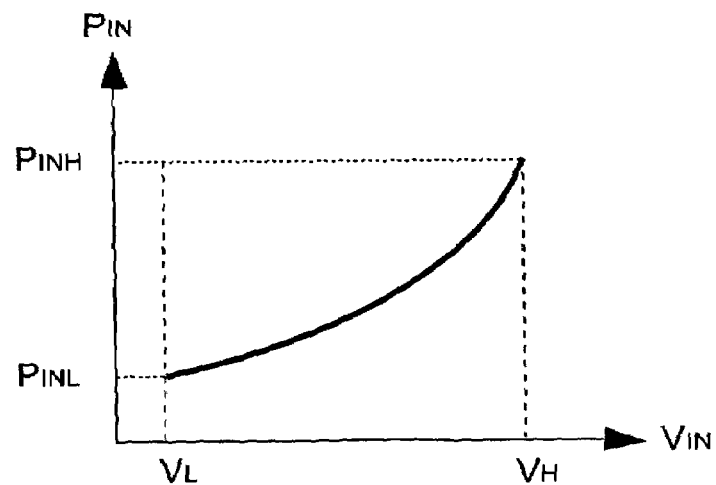
FIG. 2 is a curve showing the relation between the input voltage and the input power of a conventional power converter with a PFC circuit when the PFC circuit is activated.
Figure 3:
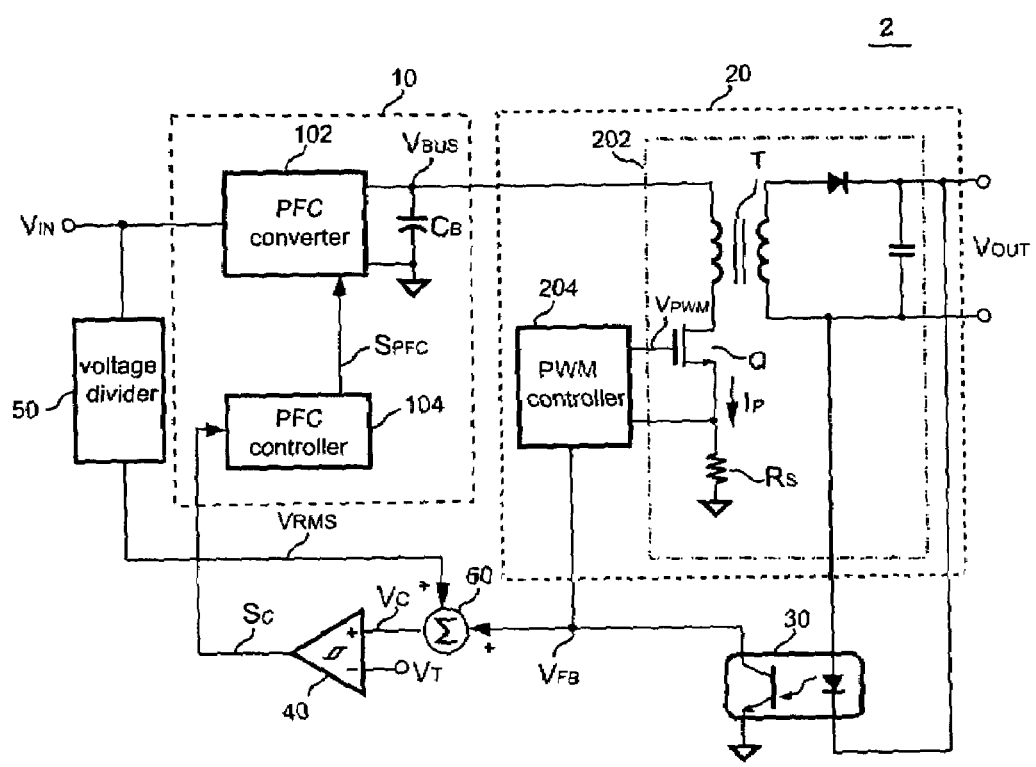
FIG. 3 is a circuit diagram according to a first preferred embodiment of the present invention.

FIG. 3 is a circuit diagram according to a first preferred embodiment of the present invention. As shown in FIG. 3, a power converter 2 of the present invention comprises a PFC circuit 10, a power stage 20, a feedback unit 30, a voltage divider 50, an operation unit 60 and a comparator 40. The PFC circuit 10 outputs a bus voltage $V_{BUS}$ in response to an input voltage $V_{IN}$. In the PFC circuit 10, a PFC controller 104 is controlled by a control signal $S_C$ generated on the output of the comparator 40. When the control signal $S_C$ is enabling, the PFC controller 104 outputs a PFC drive signal $S_{PFC}$ in a high-level to a PFC converter 102 for controlling the PFC converter 102 to perform the power factor correction and boost procedure. The bus voltage $V_{BUS}$ will be built in proportional to the input voltage $V_{IN}$ on a bus capacitor $C_B$. The power stage 20 controls the switching of a power switch Q through a PWM control signal $V_{PWM}$ generated by a PWM controller 204 so that a PWM converter 202 can convert the bus voltage $V_{BUS}$ to an output voltage $V_{OUT}$.

The feedback unit 30 is used to provide a feedback voltage $V_{FB}$ in proportional to the output voltage $V_{OUT}$. In this embodiment, the feedback unit 30 generates the feedback voltage $V_{FB}$ in response to the output voltage $V_{OUT}$ of the power stage 20. The feedback unit 30 is further coupled to the PWM controller 204. The PWM controller 204 can adjust the PWM control signal $V_{PWM}$ to control the switching of the power switch Q in response to the feedback voltage $V_{FB}$.

The voltage divider 50 generates a compensation voltage $V_{RMS}$ in response to the input voltage $V_{IN}$. The voltage divider 50 receives the input voltage $V_{IN}$ from the power converter 2 to obtain the compensation voltage $V_{RMS}$ by means of feed-forward voltage compensation. The compensation voltage $V_{RMS}$ has a higher level under the condition of a high input voltage $V_H$. The compensation voltage $V_{RMS}$ has a lower level under the condition of a low input voltage $V_L$.

The operation unit 60 outputs a first threshold voltage $V_C$ in response to the compensation voltage $V_{RMS}$ and the feedback voltage $V_{FB}$ or a reference voltage $V_T$. The operation unit 60 can be implemented by an adder or a subtractor. In this embodiment, the operation unit 60 is formed by an adder. Therefore, the first threshold voltage $V_C$ is obtained by the sum of the feedback voltage $V_{FB}$ and the compensation voltage $V_{RMS}$.

The comparator 40 is connected to the operation unit 60. The positive input of the comparator 40 is connected to the output of the operation unit 60 to receive the first threshold voltage $V_C$, and the negative input of the comparator 40 is connected to the reference voltage $V_T$. The comparator 40 compares the reference voltage $V_T$ with the first threshold voltage $V_C$. The comparator 40 generates a control signal $S_C$ once the first threshold voltage $V_C$ is larger than the reference voltage $V_T$. The control signal $S_C$ can enable the PFC circuit 10 to perform the power factor correction and boost procedure. In consideration of practical circuit application, the comparator 40 can be implemented by a hysteresis comparator to allow the reference voltage $V_T$ to have a hysteresis range.

Under the condition of equal input power, when the input voltage $V_{IN}$ is higher, the power converter 2 has a larger compensation voltage $V_{RMS}$ but the reference voltage $V_T$ keeps a constant. Because the first threshold voltage $V_C$ generated is higher through the adder operation of the operation unit 60, only a smaller feedback voltage $V_{FB}$ is required to reach the upper limit of the hysteresis range of the comparator 40. The comparator 40 outputs the control signal $S_C$ for enabling the PFC converter 102 to perform the power factor correction and boost procedure in response to the first threshold voltage $V_C$ related to the feedback voltage $V_{FB}$. When the input voltage $V_{IN}$ is lower, the compensation voltage $V_{RMS}$ is also lower. Therefore, a larger feedback voltage $V_{FB}$ is required to reach the upper limit of the hysteresis range of the comparator 40 for enabling the PFC converter 102 to perform the power factor correction and boost procedure. When the first threshold voltage $V_C$ is smaller than the lower limit of the hysteresis range, the comparator 40 outputs the control signal $S_C$ for disabling the PFC converter 102 to close the power factor correction and boost procedure.

Figure 5:
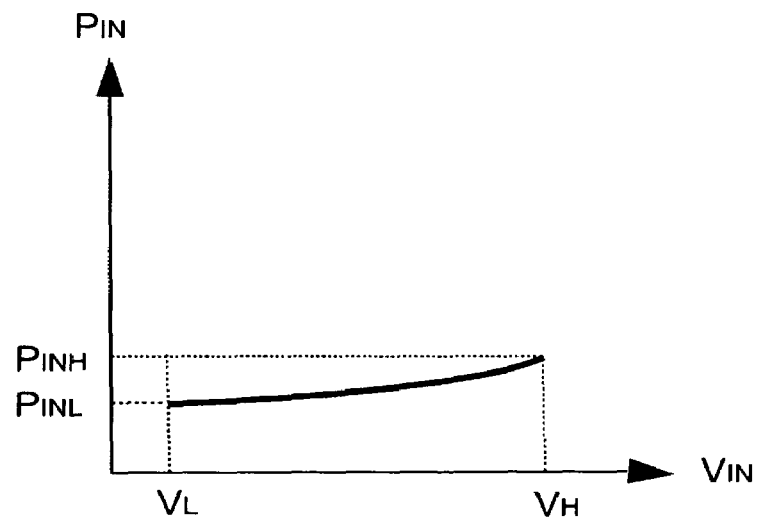
FIG. 5 is a curve showing the relation between the input voltage and the input power of a power converter with a PFC circuit of the present invention when the PFC circuit is activated.

Reference is made to FIG. 3 and FIG. 5 is a curve showing the relation between the input voltage and the input power of a power converter of the present invention when the PFC circuit is activated. The present invention uses the compensation voltage $V_{RMS}$ to compensate the feedback voltage $V_{FB}$ so that the first threshold voltage $V_C$ generated by the operation unit 60 can keep within a stable range. Therefore, the input power $P_{INH}$ for a high input voltage $V_H$ to activate the PFC converter 102 to perform the boost procedure is approximately equal to the input power $P_{INL}$ for a low input voltage $V_L$ to activate the PFC converter 102 to perform the boost procedure, hence improving the drawback in the prior art that the PFC circuit 10 cannot be activated to perform the power factor correction and boost procedure before the input power reaches 75 W under the condition of a high input voltage $V_H$.

Figure 4:
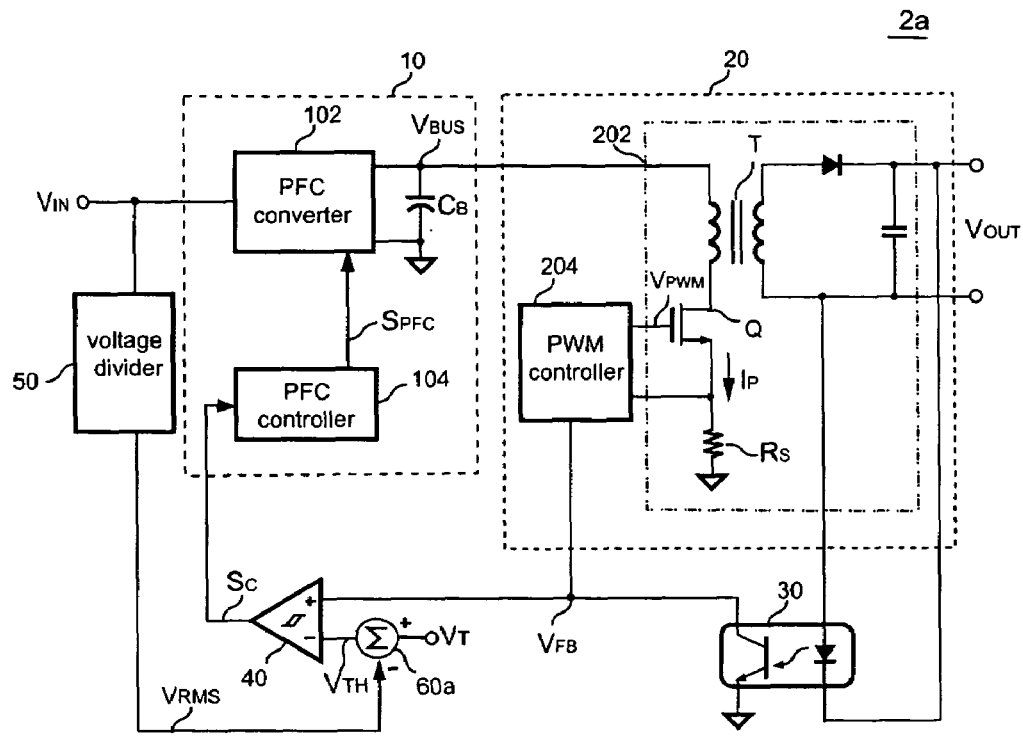
FIG. 4 is a circuit diagram according to a second preferred embodiment of the present invention.

Reference is made to FIG. 3 and FIG. 4 is a circuit diagram according to a second preferred embodiment of the present invention. The major difference between the second preferred embodiment and the first preferred embodiment is the operation unit. The operation unit is implemented by a subtractor in the second preferred embodiment. The connection relations between the operation unit 60a, the comparator 40 and the feedback unit 30 are also different. In the second preferred embodiment, the operation unit 60a is coupled to the voltage divider 50 to receive the compensation voltage $V_{RMS}$ and coupled to the reference voltage $V_T$. The operation unit 60a outputs a second threshold voltage $V_{TH}$ for building the hysteresis range of the comparator 40. The second threshold voltage $V_{TH}$ is the difference value between the reference voltage $V_T$ and the compensation voltage $V_{RMS}$.

The negative input of the comparator 40 is coupled to the operation unit 60a to receive the second threshold voltage $V_{TH}$, and the positive input of the comparator 40 is coupled to the feedback unit 30 to receive the feedback voltage $V_{FB}$. The control signal $S_C$ is to enable the PFC circuit 10 to perform the power factor correction and boost procedure once the feedback voltage $V_{FB}$ is larger than the upper limit of the hysteresis range of the comparator 40. The control signal $S_C$ is to disable the PFC circuit 10 to close the power factor correction and boost procedure once the feedback voltage $V_{FB}$ is smaller than a lower limit of the hysteresis range of the comparator 40.

Reference is made to FIG. 4 again. Under the condition of equal input power, when the input voltage $V_{IN}$ is high ($V_H$), the power converter 2a has a large compensation voltage $V_{RMS}$ but the reference voltage $V_T$ is constant. Because the second threshold voltage $V_{TH}$ generated is smaller through the subtractor operation of the operation unit 60a, only a smaller feedback voltage $V_{FB}$ is required to reach the upper limit of the hysteresis range of the comparator 40. The comparator 40 outputs the control signal $S_C$ for enabling the PFC converter 102 to perform the power factor correction and boost procedure in response to the second threshold voltage $V_{TH}$ related to the feedback voltage $V_{FB}$. When the input voltage $V_{IN}$ is low ($V_L$), the compensation voltage $V_{RMS}$ is small but the reference voltage $V_T$ is constant. Because the second threshold voltage $V_{TH}$ generated is larger through the subtractor operation of the operation unit 60a, a higher feedback voltage $V_{FB}$ is required to reach the upper limit of the hysteresis range of the comparator 40 for enabling the PFC converter 102 to perform the power factor correction and boost procedure.

To sum up, the power converter of the present invention makes use of feed-forward voltage compensation to improve the drawback in the prior art that the difference of the input power $P_{IN}$ between the lower input voltage $V_L$ and the higher input voltage $V_H$ for enabling the PFC converter 102 is too much. Moreover, this compensation method can activate the PFC circuit 10 before the input power is larger than 75 W even under the conditions of higher input voltage $V_H$ (larger than 180 Vac) and heavy load (larger than 150 W). The requirement of the international standard IEC1000-3-2 can thus be met.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A power converter with feed-forward voltage compensation for enabling a PFC circuit, comprising:
    a PFC circuit, generating a bus voltage in response to an input voltage;
    a power stage, coupled to said PFC circuit for generating an output voltage in response to said bus voltage;
    a feedback unit, coupled to said power stage for generating a feedback voltage in response to said output voltage;
    a voltage divider, generating a compensation voltage in response to said input voltage;
    an operation unit, coupled to said feedback unit and said voltage divider for generating a first threshold voltage in response to the sum of said feedback voltage and said compensation voltage; and
    a comparator, having two input ends and one output end, wherein the two input ends of the comparator connect to said operation unit and a reference voltage, and the output end of the comparator connects to said PFC circuit; said comparator is a hysteresis comparator that provides a hysteresis range in response to said reference voltage, said comparator generates said control signal to compare said hysteresis range with said first threshold voltage so as to activate said PFC circuit to perform power factor correction and boost procedure when the input power is the result of a high input voltage condition or a low input voltage condition, said reference voltage being constant.

2. The power converter with feed-forward voltage compensation as claimed in claim 1, wherein said PFC circuit comprises:
    a PFC controller, connected to said comparator for generating a power factor drive signal in response to said control signal;
    a PFC converter, coupled to said PFC controller and controlled by said power factor drive signal, wherein said PFC converter is used to activate power factor correction and boost said input voltage to said bus voltage once said power factor drive signal is enabling; and
    a bus capacitor, coupled to said PFC converter for receiving and temporarily storing said bus voltage.

3. A method for enabling a PFC circuit with feed-forward voltage compensation used in a power converter, comprising the steps of:
    generating a compensation voltage in response to an input voltage;
    generating a feedback voltage in response to an output voltage;
    providing a reference voltage, wherein said reference voltage is constant;

adding said compensation voltage to said feedback voltage for generating a first threshold voltage;

comparing said reference voltage with said first threshold voltage for generating said control signal; and enabling said PFC circuit in response to said control signal to perform power factor correction and boost procedure, wherein said reference voltage provides a hysteresis range, and said control signal is to enable said PFC circuit to perform power factor and boost procedure once said first threshold voltage is larger than an upper limit of said hysteresis range, and said control signal is to disable said PFC circuit to close power factor correction and boost procedure once said first threshold voltage is smaller than a lower limit of said hysteresis range.

* * * * *